(12) United States Patent
Jennas, II et al.

(10) Patent No.: US 9,207,874 B2
(45) Date of Patent: *Dec. 8, 2015

(54) SYNCHRONOUS EXTENT MIGRATION PROTOCOL FOR PAIRED STORAGE

(71) Applicant: INTERNATIONAL BUSINESS MACHINES CORPORATION, Armonk, NY (US)

(72) Inventors: Paul A. Jennas, II, Tucson, AZ (US); Larry Juarez, Tucson, AZ (US); David Montgomery, San Jose, CA (US); Todd C. Sorenson, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/459,904

(22) Filed: Aug. 14, 2014

(65) Prior Publication Data

US 2014/0359217 A1    Dec. 4, 2014

Related U.S. Application Data

(63) Continuation of application No. 14/043,046, filed on Oct. 1, 2013, now Pat. No. 8,868,871, which is a continuation of application No. 12/970,832, filed on Dec. 16, 2010, now Pat. No. 8,560,792.

(51) Int. Cl.
*G06F 3/06* (2006.01)
*G06F 11/20* (2006.01)

(52) U.S. Cl.
CPC .............. *G06F 3/0647* (2013.01); *G06F 3/065* (2013.01); *G06F 3/067* (2013.01); *G06F 3/0611* (2013.01); *G06F 3/0614* (2013.01); *G06F 3/0649* (2013.01); *G06F 3/0683* (2013.01);

(Continued)

(58) Field of Classification Search
CPC . G06F 11/2097; G06F 3/0685; G06F 3/0647; G06F 3/0683; G06F 3/067; G06F 3/0614; G06F 3/065; G06F 3/0649; G06F 3/0611
See application file for complete search history.

(56) References Cited

U.S. PATENT DOCUMENTS

| 5,313,631 A | 5/1994 | Kao |
| 6,442,601 B1 | 8/2002 | Gampper et al. |
| 6,463,513 B1 | 10/2002 | Bish et al. |

(Continued)

FOREIGN PATENT DOCUMENTS

| CN | 101681282 A | 3/2010 |
| EP | 1840723 A2 | 10/2007 |

(Continued)

*Primary Examiner* — Ryan Bertram
(74) *Attorney, Agent, or Firm* — Griffiths & Seaton PLLC

(57) ABSTRACT

Extent migration is provided in a data storage environment configured for synchronous replication between a primary and secondary pair of storage entities, each having tiered storage devices. In one embodiment, by way of example only, a migration instruction is sent, by the primary storage entity, to the secondary storage entity, the migration instruction including a relative priority based on a primary ordered heat map of the tiered storage devices of the primary storage entity. The relative priority is used against a secondary ordered heat map of the tiered storage devices of the secondary storage entity to perform the extent migration, regardless of whether the primary and secondary storage entities are identical.

8 Claims, 4 Drawing Sheets

TWO SYSTEMS WITH SAME OVERALL CAPACITY BUT WITH THAT CAPACITY MADE UP OF DIFFERENT TIERS    134

(52) U.S. Cl.
CPC ............ *G06F3/0685* (2013.01); *G06F 3/0689* (2013.01); *G06F 11/2097* (2013.01)

(56) References Cited

U.S. PATENT DOCUMENTS

| | | | |
|---|---|---|---|
| 6,502,205 | B1 | 12/2002 | Yanai et al. |
| 7,007,135 | B2 | 2/2006 | Koo et al. |
| 7,165,158 | B1 | 1/2007 | Yagawa |
| 7,320,058 | B2 | 1/2008 | Fujibayashi et al. |
| 7,330,948 | B2 | 2/2008 | Deguchi et al. |
| 7,650,477 | B2 | 1/2010 | Deguchi et al. |
| 2002/0194431 | A1 | 12/2002 | Koo et al. |
| 2007/0239803 | A1 | 10/2007 | Mimatsu |
| 2008/0154913 | A1 | 6/2008 | Kohonen |
| 2009/0300079 | A1 | 12/2009 | Shitomi |
| 2010/0274826 | A1 | 10/2010 | Takata et al. |
| 2011/0072225 | A1 | 3/2011 | Kawaguchi et al. |
| 2011/0252210 | A1 | 10/2011 | Davies |
| 2012/0079224 | A1 | 3/2012 | Clayton et al. |
| 2012/0159096 | A1 | 6/2012 | Jennas, II et al. |
| 2012/0260052 | A1 | 10/2012 | Jennas, II et al. |
| 2012/0272030 | A1 | 10/2012 | Jennas, II et al. |

FOREIGN PATENT DOCUMENTS

| | | |
|---|---|---|
| JP | 2008015984 A | 1/2008 |
| JP | 2008197779 A | 8/2008 |

TWO SYSTEMS WITH SAME OVERALL CAPACITY BUT WITH
THAT CAPACITY MADE UP OF DIFFERENT TIERS

SYNCHRONOUS EXTENT MIGRATION PROTOCOL FOR PAIRED STORAGE

CROSS-REFERENCE TO RELATED APPLICATIONS

This application is a Continuation of U.S. patent application Ser. No. 14/043,046, filed Oct. 1, 2013, which is a Continuation of U.S. patent application Ser. No. 12/970,832, filed on Dec. 16, 2010, now U.S. Pat. No. 8,560,792.

FIELD OF THE INVENTION

The present invention relates in general to computers, and more particularly to apparatus, method and computer program product embodiments for extent migration, in a data storage environment configured for synchronous replication between a primary and secondary pair of storage entities, each having tiered storage devices, extent migration.

DESCRIPTION OF THE RELATED ART

Computers and computer systems are found in a variety of settings in today's society. Computing environments and networks may be found at home, at work, at school, in government, and in other settings. Computing environments increasingly store data in one or more storage environments, which in many cases are remote from the local interface presented to a user.

These computing storage environments may use many storage devices such as disk drives, often working in concert, to store, retrieve, and update a large body of data, which may then be provided to a host computer requesting or sending the data. In some cases, a number of data storage subsystems are collectively managed as a single data storage system. These subsystems may be managed by host "sysplex" (system complex) configurations that combine several processing units or clusters of processing units. In this way, multi-tiered/multi-system computing environments, often including a variety of types of storage devices, may be used to organize and process large quantities of data.

SUMMARY OF THE DESCRIBED EMBODIMENTS

Current tiered-storage architectures, as described above, include a variety of storage mediums. These may include such media as enterprise hard disk drives (HDD), serial advanced technology attachment (SATA) disk drives, solid state drives (SSD), tape drives, and other devices. Data may be migrated between such devices. Placement of certain kinds of data in the appropriate medium may greatly enhance overall performance of the storage environment.

In a pair of tiered storage systems (e.g., primary and secondary) having a synchronous mirroring relationship, for example, the storage systems cannot take full advantage of data migration functionality because, at least in part, the secondary system does not receive host input/output (I/O). The profiling algorithms generally used in the primary system to determine which data should be migrated cannot be used accurately on the secondary system. As a result, performance and efficiency of the entire storage environment may be negatively affected. A need exists for a mechanism whereby such storage entities may migrate data on each entity, respectively, at approximately the same time.

Accordingly, and in view of the foregoing, various system, method, and computer program product embodiments for extent (i.e., data segment) migration in a data storage environment configured for synchronous replication between a primary and secondary pair of storage entities, each having tiered storage devices, are provided. In one embodiment, by way of example only, a migration instruction is sent, by the primary storage entity, to the secondary storage entity, the migration instruction including a relative priority based on a primary ordered heat map of the tiered storage devices of the primary storage entity. The relative priority is used against a secondary ordered heat map of the tiered storage devices of the secondary storage entity to perform the extent migration, regardless of whether the primary and secondary storage entities are identical.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
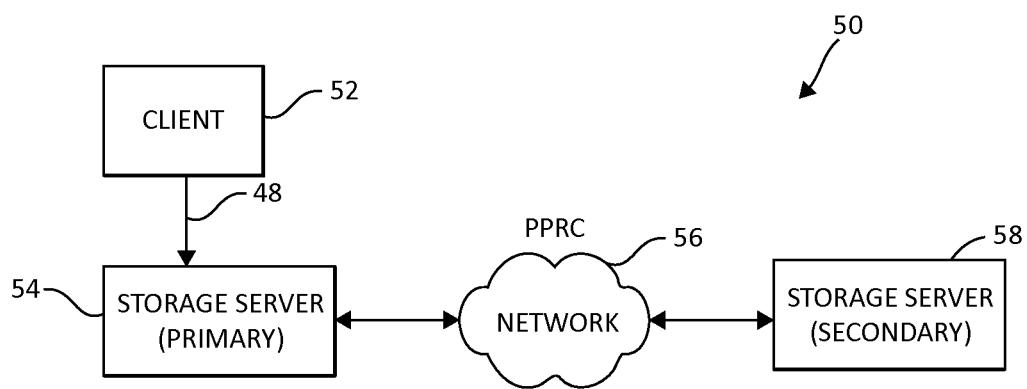
FIG. 1 is a block diagram illustration of an exemplary computing storage environment in accordance with certain embodiments.

As previously mentioned, tiered storage systems configured in a synchronous mirroring relationship are not currently configured to take full advantage of extent migration functionality because the secondary storage system doesn't receive host input/output (I/O). I/O is instead received from the primary storage system. Again as previously mentioned, as a result, the profiling algorithms to determine which data segments should be migrated cannot be performed accurately on the secondary system because the secondary system only receives write I/O operations. When the primary system determines to move an extent, the secondary system may not know to move the extent. Consider the following example. As the secondary machine still has the extent on a lower tier, and as writes need to complete on both the primary and the secondary systems prior to sending a completion status back to the host, the write performance is still the write performance of the lower tier, even though the primary system subsequently moved the extent to a higher tier.

In addition, in the event that the host fails over to the secondary system, current methodologies require the secondary system to "learn" which data segments are extensively used and which are not (i.e., "hot" and "cold" data segments), and move the data segments accordingly. This learning process expends time and resources, during which time performance is degraded.

An additional issue is raised when the primary and secondary systems are not mirrored versions of each other. For example, the capacity of each storage system may include a differing set of storage device families, but the overall capacity may be the same or greater (e.g., the primary system may have more solid state devices (SSDs) than the secondary system). In this situation, an additional complexity is seen because the secondary system does not appreciate the value placed on a particular data segment (relative to other data segments) by the primary system. Without additional information, it is difficult or impossible for the secondary system to determine the appropriate placement of the data segment in its system that reflects this value.

The illustrated embodiments provide mechanisms for efficient extent migration functionality between tiered storage in a storage environment configured in a synchronous mirroring relationship. As will be further described, these mechanisms, in one aspect, implement a migration instruction that is sent between the primary and secondary storage systems. The migration instruction is a data structure that may be adapted with several fields, as will be further described. In one of such fields, a time delta is included. This calculation allows the secondary storage system to ascertain the correct time to migrate a particular extent such that both the primary and secondary storage systems migrate the extent at approximately the same time.

In another aspect, to address potential issues that may arise when storage systems are not mirror images of each other, as previously described, an additional data field may be configured for relative priority data based on a primary ordered heat map of the tiered storage devices of the primary storage system. The relative priority is used against a secondary ordered heat map of the tiered storage devices of the secondary storage system to perform the extent migration, as will be further described. Additional aspects and advantages will be further described, following.

FIG. 1 is a block diagram illustration of an exemplary storage system 50 configured in a synchronous mirroring relationship (such as an IBM® TotalStorage® Peer-to-Peer Redundant Copy (PPRC) system). A primary storage server 54 receives input/output (I/O) from one or more clients 52 as shown. The storage server 54 is connected through a network 56 to a remote, secondary storage server 58.

As an exemplary synchronous mirroring function, PPRC is a function that continuously updates a secondary (target) copy of a storage volume to match changes made to a primary (source) volume (such as an ESS storage disk). Any pair of equal-sized volumes can be configured for a PPRC relationship, during which all write operations performed on the source are synchronously mirrored to the target device. The PPRC protocol guarantees that the secondary copy is constantly up-to-date by ensuring that the primary copy is written only if the primary storage subsystem received acknowledgement that the secondary copy has been written. The paired volumes typically reside on two distinct and geographically separated ESS devices communicating over ESCON® or over a fiber channel link.

Figure 2:
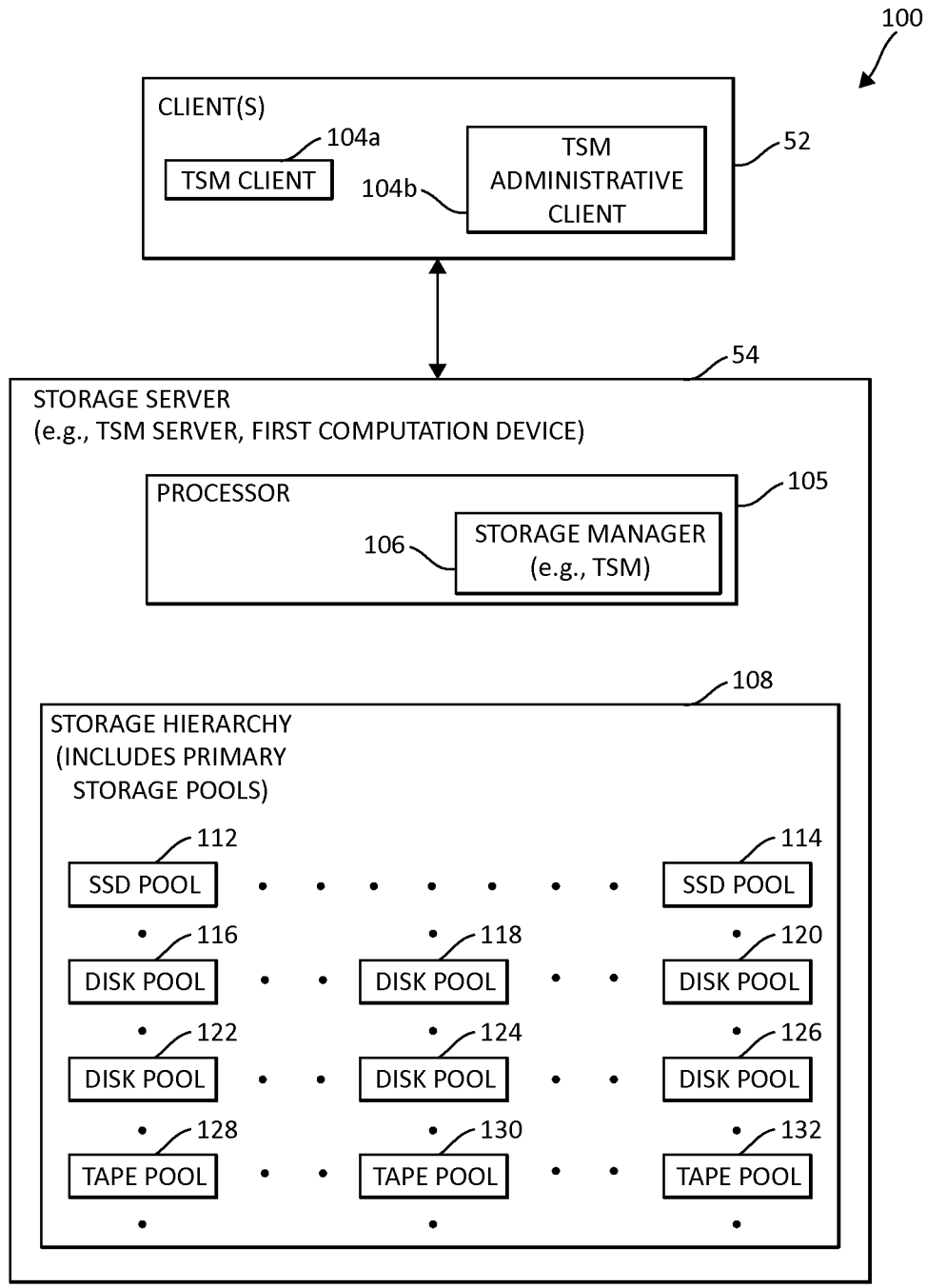
FIG. 2 is a block diagram illustration of an exemplary storage hierarchy in a storage server.

Turning now to FIG. 2, a block diagram of a computing storage environment 100 in accordance with certain embodiments is illustrated. The computing storage environment 100 includes a first computational device, such as storage server 54 as illustrated previously, coupled to one or more computational devices, such as clients 52. In certain embodiments, the storage server 54 and the clients 52 may comprise any suitable computational device, including those presently known in the art, such as, a personal computer, a workstation, a mainframe, a midrange computer, a network appliance, a palm top computer, a telephony device, a blade computer, a hand held computer, etc.

In some embodiments, a storage manager 106, such as IBM® Tivoli® Storage Manager® (TSM), may be used for securely storing and managing data segments according to aspects of the present invention. The storage manager 106 may execute in a storage management server, such as a TSM server 102 or elsewhere. In one embodiment, the storage manager is operable by and/or in conjunction with processor device 105 as shown. One of ordinary skill in the art will appreciate that various other configurations of the processor 105, storage manager 106, and related additional processing and/or memory components are contemplated. IBM, Tivoli, and Tivoli Storage Manager are trademarks or registered trademarks of IBM Corporation.

The TSM may provide data storage services to clients, such as TSM clients 104a, for management of data. The TSM server 102 may store files sent to the TSM server 102 by one or more TSM clients 104a. The storage manager 106 and/or processor device 105 may allow a system administrator to configure storage pools, where a storage pool comprises a group of devices used for storing data received from the TSM client 104a. Storage pools are used as targets for store operations from the TSM client 104a and are referenced in TSM server policies and other constructs for processing.

As shown, a variety of storage devices may be organized into a storage hierarchy. Storage media within the storage hierarchy may thus be grouped into data structures referred to herein as storage pools. The storage hierarchy may be organized to correspond with one or more metrics, such as a performance metric including write or read speeds. The storage hierarchy 108 as shown may be organized such that the top of the hierarchy may include a cache pool 110 having a highest amount or quality of a particular performance metric. Below the cache pool 110, a number of solid state drive (SSD) class devices may be organized into SSD pools by the same, similar, or other metrics (e.g., SSD pools 112 and 114).

Below the SSD pools 112 and 114, a first tier of disk pools (e.g., disk pools 116, 118, and 120) may be then organized. As one of ordinary skill in the art will appreciate, disk pools 116, 118, and 120 may include a variety of disk devices such as pools of enterprise disk drives, SATA disk drives, disk devices configured in a particular redundant array of independent disks (RAID) configuration, and the like.

The first tier of disk pools may be located above a second tier of disk pools (e.g., pools 122, 124, and 126) by virtue of exhibiting a greater amount, stronger attribute or attributes, or quality of the performance metric. Below the second tier of disk pools, an additional tier of tape pools (e.g., tape pools 128, 130, and 132) may then be organized. Various considerations for the organization of such storage hierarchies 108 may be apparent to one of ordinary skill in the art. In one embodiment, the system administrator may assist in performing such configurations in the storage hierarchy 108 by inputs to the TSM administrative client 104b or another mechanism.

The illustrated embodiments provide mechanisms for efficient placement of appropriate data in the SSD pools 112 and 114, and thereby overall placement of data between storage mediums such as that found in the storage hierarchy 108. In one embodiment including a tier of disk pools corresponding to a number of SSD devices, the storage server 54 performs I/O profiling activity on particular data segments by examining such statistical information such as the aforementioned read/write ratio. Those data segments having a higher readto-write ratio (e.g., less writes) are better candidates for SSD storage than those data segments having a lower read-to-write ratio (e.g., more writes).

Each data segment in a candidate group (such as those in a particular volume or group of volumes, pool, tier of pools, or similar group) may be first analyzed to determine if the particular data segment has been repetitively accessed. If this is the case, the particular data segment is thought to be a good candidate for SSD storage, as its particular I/O profile demonstrates that the data segment is in demand, and that overall performance of the computing environment would benefit if the latency of this particular data segment were reduced.

If a particular data segment is identified as described above, it may then be added to a "hot" list of data segments. The hot list of data segments may then be iterated, and for a given extent, the read/write ratio is examined. If the read/write ratio is determined to be greater than a predefined threshold, the hot data segment is added to an additional list of "ratio" data segments that are identified as having a higher read/write ratio.

Figure 3:
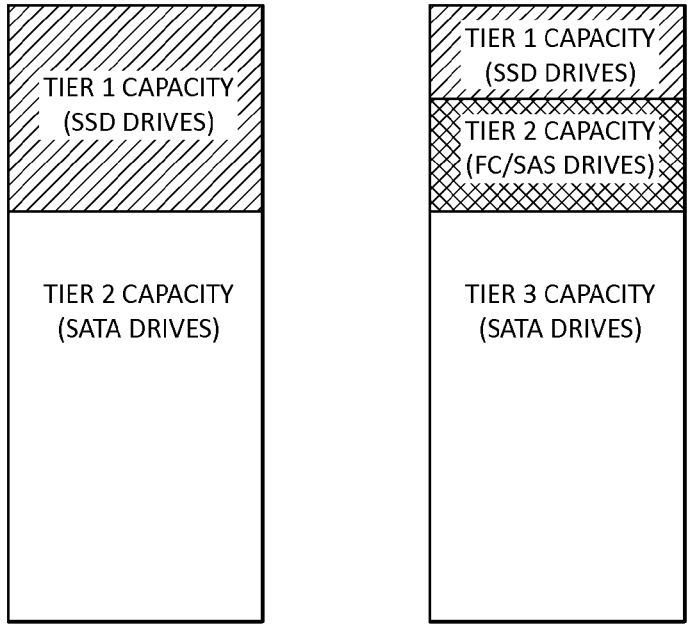
FIG. 3 is a block diagram illustration of exemplary storage systems having a similar overall capacity but having differing tiered storage.

Turning to FIG. 3, an exemplary illustration 134 of two storage systems (e.g., primary and secondary) is seen. Each storage system includes indications of varying capacities of the respective tiers of storage devices incorporated. For example, the primary storage system illustrated includes approximately ⅔ of the overall capacity as Serial Advanced Technology Attachment (SATA) drives (in Tier 2), while the remaining ⅓ of the overall capacity is made up of SSD drives (in Tier 1). The secondary storage system illustrated includes approximately again ⅔ of its overall capacity as SATA drives as was the case previously (here as Tier 3 devices), but the remaining ⅓ of the overall capacity is shared between Tier 1 SSD drives and Tier 2 Fibre Channel drives as shown.

In view of the illustration 134 shown in FIG. 3, an issue is brought to bear as previously described where storage systems are not minor images of each other, where one storage system may have capacity to move a data segment to a given tier to increase performance, however, the opposing storage system may not have enough capacity to move the data structure to the same tier. Depending on the particular workload, moving the data structure to a higher tier may not provide a corresponding increase in performance. Accordingly, the particular system may as well save the space for a data segment that would provide the performance benefit.

To address this issue such that the two systems can make better decisions on whether or not a data segment should be moved, a relative priority field may be added to a migration instruction sent between the primary and secondary storage system when the primary storage system determines to move a particular data segment. In one embodiment, the relative priority may be calculated by using a heat map per data structure (i.e., extent), and ordering the extents from hot to cold. The hottest extent is assigned top priority or priority 100%. The next hottest extent may have the next highest priority (e.g., priority 99%), and so forth until all extents have been assigned a given priority based on a percentage of where the extent falls in the ordered heat map. In view of the foregoing, in one embodiment, the relative priority is calculated as the ordered heat map number divided by the total number of extents in the system, multiplied by 100.

To further clarify relative priority of a particular storage system, considering the following example. A primary storage controller's capacity is made up of approximately 40% SSD devices and 60% SATA devices, while the secondary storage controller's capacity is made up of approximately 20% SSD, 40% Fibre Channel devices, and 40% SATA devices. The primary storage system values its hottest 40% of data segments on the SSD devices, and the remaining data on the SATA devices. The secondary storage system values its hottest 10% of extents on SSD devices, the next 40% of the hottest extents on the Fibre Channel devices, and the remaining 50% of the data on the slower SATA devices.

Figure 4A:
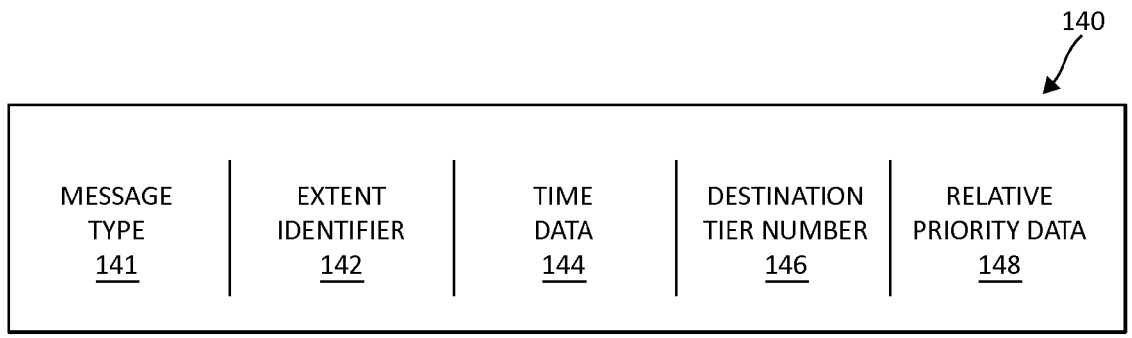
FIG. 4A is a block diagram illustration of an exemplary migration instruction data structure.

Turning to FIG. 4A, an exemplary data structure configured as a migration instruction 140, for implementing various aspects of the illustrated embodiments, is shown. Migration instruction 140 is sent from the primary storage system to the secondary storage system as will be further described. In the illustrated embodiment, the migration instruction 140 is configured with a message type field 141, an extent identifier field 142, a time delta field 144, a destination tier number field 146, and a relative priority field 148 as shown. Message type field 141, in one embodiment, is a unique identifier that determines what type of message is being sent. In one embodiment, the following are valid types of messages. First, a relative priority tier query message may be used by the primary storage system to query the secondary storage system as to which tier the secondary storage system could move an extent to, based on the relative priority data include in the message. Second, a secondary relative priority response message may be used by the secondary storage system to respond to the primary storage system's relative priority tier query message. Third, a move extent message may be used by the primary storage system to communicate to the secondary storage system to move an extent to a given tier. Finally, a secondary acknowledge (ACK) message may be sent to the primary storage system to indicate that a particular extent was successfully migrated.

Extent identifier field 142, in one embodiment, is a unique identifier that identifies the data segment (here an extent) to be moved (for example, within a particular volume). Time delta field 144 identifies the applicable time delta when the secondary system should move the data segment, as will be further described. Destination tier number 146, in one embodiment, identifies the applicable tier the primary storage system plans on moving the data segment to. Finally, relative priority 148 identifies, as previously described, a percentage within an ordered list of all extents sorted by heat. In one embodiment, the hottest extent has a priority 100%, again as previously described, while the coldest extent has a priority 0%.

Figure 4B:
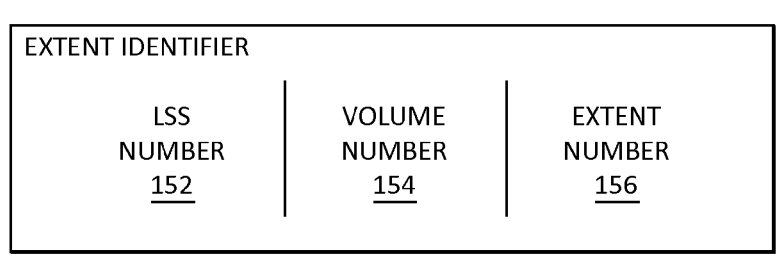
FIG. 4B is a block diagram illustration of an exemplary extent identifier data structure.

FIG. 4B illustrates an exemplary data structure configured as an extent identifier 150, again for implementing various aspects of the illustrated embodiments. In the illustrated embodiment, extent identifier 150 is configured with three parameters to identify a particular extent. First, the logical storage subsystem (LSS) number for the particular extent is included. Next, the applicable volume number 154 for the particular extent is included. Finally, an applicable extent number 156 in the volume is included, as shown.

Consider the following example of a volume A, having extents 0 to 0xFFFF (hexadecimal). The primary storage system determines that an extent 1 in volume 1 in LSS 1 should be migrated (for example, the extent is determined to be a hot extent). Accordingly, the extent identifier sent to the secondary follows as 0x110x110x1.

Consider now the following example of an embodiment using the relative priority data to accomplish extent migration. As a first step in the example, the primary system determines that an extent has become hot enough that it needs to be moved to a higher tier (e.g. SSD Tier). The primary system then calculates the relative priority of the extent from its perspective. As a following step, the primary system performs the necessary calculations to feel out all the fields in the message (e.g., Extent Identifier, Time to Move Extent, Relative Priority, Destination Tier Number).

As a next step, a "Relative Priority Tier Query Message" as previously described is sent to the secondary storage system. The secondary storage system receives the message and calculates which tier the relative priority would map into based on its storage system. For instance, if the relative priority number was 80 then in this example the extent would map to the Fiber Channel drive tier (Secondary is 10% SSD, 40% FC, 50% SATA, so relative priority of 90 or greater would map to SSD, relative priority of less than 90 but greater than 50 would map to FC, and relative priority number of less than 50 would map to SATA tier).

The secondary storage system then sends a "Secondary Response Message" as previously described to the primary system indicating which tier it could move the extent to, based on the relative priority information. The primary system receives the response and does the following based on the response. First, if the secondary system is able to move the extent to the same tier that the primary system is requesting, then the primary system sends a "Move Extent" message to the secondary system to move the extent at the given time, and both systems move the extent to the given tier. Second, if the secondary system cannot move the extent to the same tier, then the primary system determines what should be done with the extent as follows. The primary system may, in one embodiment, take the following into consideration, including read/write ratios, ratios of sequential vs. non-sequential accesses, and quality of service requirements to determine what would be the most beneficial to the host application.

If the I/O has a high read/write ratio (high read data) the secondary system moves the data to the given tier. This is because all reads only go to the primary and having the primary move the extent to the appropriate tier would thus improve read performance. If the read/write ratio is such that moving to the tier that the secondary responded with would give a performance boost, then the primary system sends a "Move Message" to the secondary and both systems move the extent to that tier. For example if and extent was found on a SATA tier, and the secondary system wanted to move the extent to an SSD, but the secondary system could only move the data to an Fiber Channel tier, the primary could decide to at least move the data to the Fiber Channel tier, which would give the host better performance.

The primary system may, in one embodiment, decide not to move the extent at all. For instance if the read/write was low (lots of writes) and the secondary could not move the extent to a higher tier, then moving the extent on the primary system would be of little benefit as all writes have to complete on both the primary and the secondary before giving complete status to the host. Therefore the write is always limited by the slowest tier, and thus, the primary would only use up valuable space on a higher tier with no host benefit. Accordingly, it would better to maintain the extent on the current tier.

Figure 5:
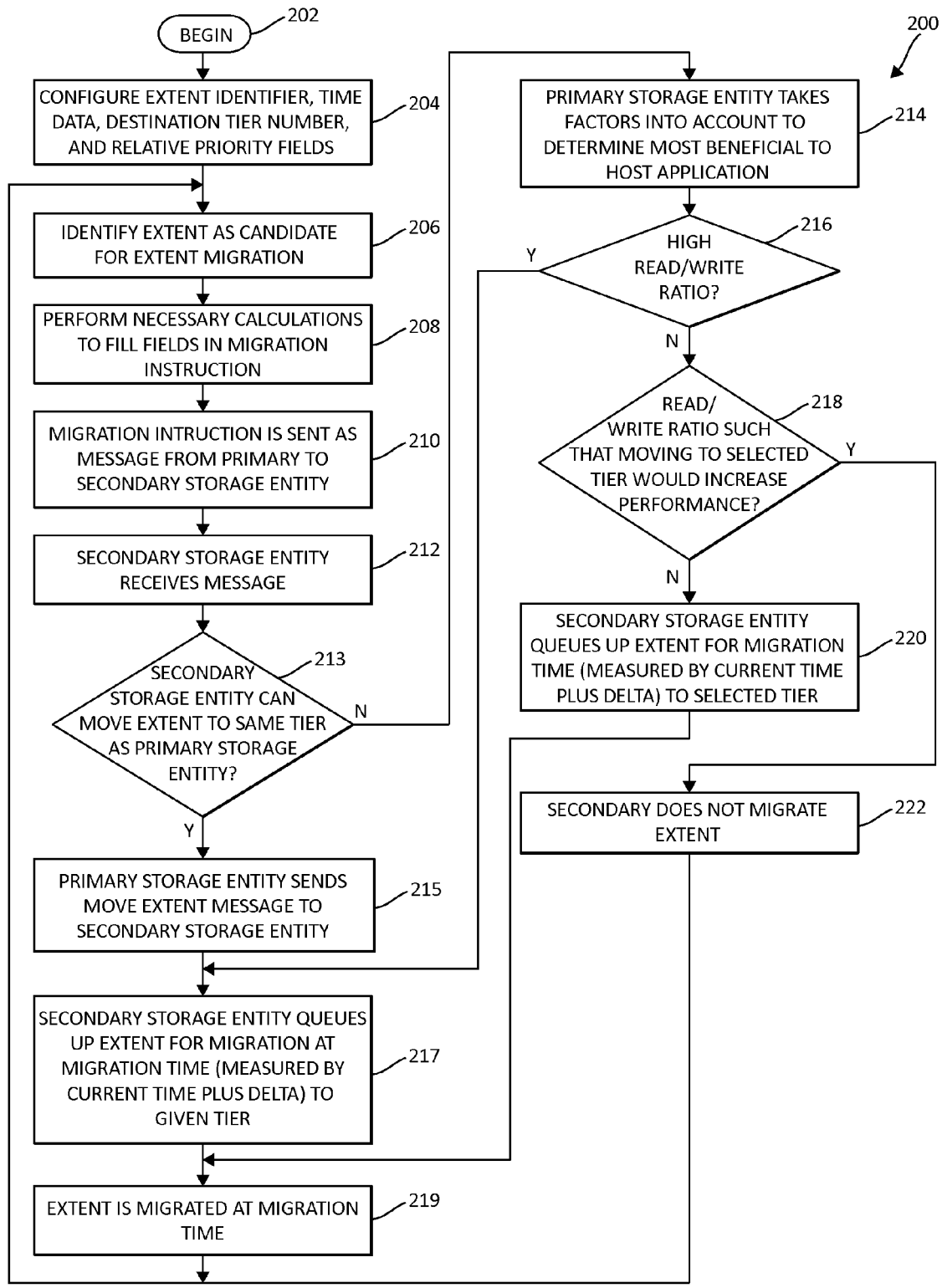
FIG. 5 is a flow chart illustration of an exemplary method for extent migration in a storage environment having a pair of synchronously mirrored storage entities, in which various aspects of the illustrated embodiments may be implemented.

Turning now to FIG. 5, following, a flow chart illustration of an exemplary method 200 for extent migration functionality in a storage system configured with pairs of synchronously mirrored storage entities, in which various aspects of the illustrated embodiments may be implemented, is presented. As one of ordinary skill in the art will appreciate, various steps in the method 200 may be implemented in differing ways to suit a particular application. In addition, the described method 200 may be implemented by various means, such as hardware, software, firmware, or a combination thereof operational on or otherwise associated with the computing storage environment. For example, the methods 200 may be implemented, partially or wholly, as a computer program product including a computer-readable storage medium having computer-readable program code portions stored therein. The computer-readable storage medium may include disk drives (including SSD devices), flash memory, digital versatile disks (DVDs), compact disks (CDs), and other types of storage mediums.

Method 200 begins (step 202) by configuring a migration instruction with at least one of a message type, extent identifier, time delta, destination tier number, and relative priority fields (step 204). At a subsequent time, a particular extent is identified as a candidate for extent migration (step 206). This identification may be obtained through analysis of various storage characteristics and factors associated with the extent as previously described, such as read/write ratios, and the like. Once an extent migration candidate is selected, the necessary calculations to fill each of the previously configured extent identifier, time delta, and destination tier number fields are made (step 208). Once these fields are filled, the data structure is sent to the primary storage system to the secondary storage system as a migration instruction (step 210). The secondary storage system receives the migration instruction message (step 212), and in response (and again, based on the relative priority information), sends a secondary response message to the primary storage system, indicating which tier it could migrate the extent to.

Once the response is received, if the secondary storage system has determined that it can move the extent to the same tier as the primary storage system (step 213), the primary storage system sends a "move extent" message to the secondary storage system (step 215), and accordingly queues up the extent for migration at a migration time measured by the storage system's current time plus the time delta for the given tier (step 217). As the migration time approaches, the extent is then migrated on the secondary storage system, at a time approximately equal to when the mirrored extent is migrated on the primary storage system (step 219). The method 200 then returns to step 206, where, at a subsequent time, the primary storage system again identifies a new extent as a migration candidate.

Returning now to step 213, if the extent cannot be moved to the same tier, the primary storage system takes a number of factors into account, such as read/write ratios, ratios of sequential versus non-sequential access, quality of service requirements, and the like, to determine which approach would be beneficial to the host application (step 216). If, for example, the I/O has a high read/write ratio (e.g., high read data as previously described), then the method 200 returns to step 217 to queue the extent and migrate the extent to the given tier, and continues to step 219 as previously described. Alternatively (returning to step 216), if the read/write ratio is such that migration of the extent to the selected tier would increase performance (step 218), then the secondary storage system queues up the extent for migration at the migration time to the selected tier (step 220), and the extent is migrated at the migration time (step 219) as previously indicated. Alternatively (returning to step 218), the primary and/or secondary storage system may decide not to migrate the extent (step 222), and the method 200 returns to step 206 as indicated.

As one of ordinary skill in the art will appreciate, the method 200 may be additionally performed on a scheduled interval in lieu of the storage request previously described. The scheduling may occur pursuant to various implementations of the computing storage environment. For example, the scheduling may coincide with periods of high and/or low storage activity. The scheduling may be configured by a system administrator using the storage manager 106 (FIG. 1) or by other similar means.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagram in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While one or more embodiments of the present invention have been illustrated in detail, one of ordinary skill in the art will appreciate that modifications and adaptations to those embodiments may be made without departing from the scope of the present invention as set forth in the following claims.

What is claimed is:

1. In a data storage environment configured for synchronous replication between a primary and secondary pair of storage entities, each having tiered storage devices, a method for extent migration by a processor device, comprising:
sending, by the primary storage entity, a migration instruction to the secondary storage entity, the migration instruction including a relative priority based on a primary ordered heat map of the tiered storage devices of the primary storage entity.

2. The method of claim 1, wherein the relative priority is used against a secondary ordered heat map of the tiered storage devices of the secondary storage entity to perform the extent migration, regardless of whether the primary and secondary storage entities are identical.

3. The method of claim 1, wherein the migration instruction further includes a time delta approximately equal to a time of an intended migration at the primary storage entity adjusted for a transmission time such that the primary and secondary storage entities conduct the extent migration at approximately a same time.

4. The method of claim 1, further including, by at least a storage activity factor, identifying an extent as a candidate for the extent migration.

5. The method of claim 3, further including configuring the migration instruction with at least one of a message type field, an extent identifier field, a time delta field in which the time delta is incorporated, a destination tier number field, and a relative priority field.

6. The method of claim 4, further including, upon receipt of the migration instruction by the secondary storage entity:
- determining, using the relative priority, which of the tiered storage devices of the secondary storage entity to migrate the extent, and
- acknowledging which of the tiered storage devices of the secondary storage entity to the primary storage entity.

7. The method of claim 6, further including determining, by the primary storage entity, based on the acknowledgment of the secondary storage entity, whether to perform the extent migration to which of the tiered storage devices.

8. The method of claim 7, wherein the determining whether to perform the extent migration includes considering at least one of a read/write ratio, a ratio of sequential to non-sequential access, and a quality of service requirement.

\* \* \* \* \*